US008214899B2

(12) United States Patent
Chien

(10) Patent No.: US 8,214,899 B2
(45) Date of Patent: Jul. 3, 2012

(54) IDENTIFYING UNAUTHORIZED ACCESS TO A NETWORK RESOURCE

(76) Inventor: Daniel Chien, Mercer Island, WA (US)

(*) Notice: Subject to any disclaimer, the term of this patent is extended or adjusted under 35 U.S.C. 154(b) by 1264 days.

(21) Appl. No.: 11/686,918

(22) Filed: Mar. 15, 2007

(65) Prior Publication Data

US 2007/0220605 A1    Sep. 20, 2007

Related U.S. Application Data

(60) Provisional application No. 60/782,601, filed on Mar. 15, 2006, provisional application No. 60/783,446, filed on Mar. 17, 2006.

(51) Int. Cl.
*H04L 29/06* (2006.01)

(52) U.S. Cl. ............................................ 726/23; 726/27

(58) Field of Classification Search .................... 726/23, 726/27
See application file for complete search history.

(56) References Cited

U.S. PATENT DOCUMENTS

| 6,502,135 | B1 | 12/2002 | Munger | |
|---|---|---|---|---|
| 6,654,796 | B1 | 11/2003 | Slater et al. | |
| 6,687,226 | B1 | 2/2004 | Galyas | |
| 6,888,834 | B1 | 5/2005 | Wood et al. | |
| 7,111,163 | B1 | 9/2006 | Haney | |
| 7,143,175 | B2 | 11/2006 | Adams et al. | |
| 7,346,770 | B2 | 3/2008 | Swander et al. | |
| 7,363,656 | B2 * | 4/2008 | Weber et al. ................... | 726/23 |
| 7,457,823 | B2 | 11/2008 | Shraim et al. | |
| 7,461,404 | B2 * | 12/2008 | Dudfield et al. ................ | 726/25 |
| 7,536,723 | B1 | 5/2009 | Bhagwat et al. | |
| 7,725,936 | B2 * | 5/2010 | Banerjee et al. ................ | 726/23 |
| 7,797,436 | B2 * | 9/2010 | Banerjee et al. ............... | 709/229 |
| 2002/0133721 | A1 * | 9/2002 | Adjaoute ....................... | 713/201 |
| 2003/0101357 | A1 | 5/2003 | Ronen et al. | |
| 2003/0149668 | A1 | 8/2003 | Lee et al. | |
| 2003/0149887 | A1 * | 8/2003 | Yadav ............................ | 713/200 |
| 2003/0149888 | A1 * | 8/2003 | Yadav ............................ | 713/200 |
| 2003/0185395 | A1 | 10/2003 | Lee et al. | |
| 2003/0188190 | A1 * | 10/2003 | Aaron et al. ................... | 713/201 |
| 2003/0217289 | A1 * | 11/2003 | Ammon et al. ................ | 713/201 |
| 2004/0003285 | A1 * | 1/2004 | Whelan et al. ................. | 713/201 |
| 2004/0068562 | A1 * | 4/2004 | Tilton et al. .................... | 709/225 |

(Continued)

OTHER PUBLICATIONS

International Search Report and Written Opinion mailed Apr. 23, 2008, which issued during the prosecution of International Patent Application No. PCT/US07/64102.

(Continued)

*Primary Examiner* — Vivek Srivastava
*Assistant Examiner* — Thong Truong
(74) *Attorney, Agent, or Firm* — Lowe Graham Jones PLLC

(57) ABSTRACT

An online service gathers information about a user's access to an online account and makes that information available to the account owner and/or other authorized user. When an online account is accessed, the online service logs a time stamp, a network address from which the account was accessed, a port number, a user ID, routing data, and/or other access data. The online service may use the access information to obtain address ownership name, geographic location, and/or other ownership information associated with the account access. The accessing client also stores access data. The client, account owner, and/or another decision maker evaluates all, or portions of information to detect unauthorized access to the account. The decision maker may dynamically evaluate and display the access data or later compare log files of the online service and the account owner's local log file.

20 Claims, 6 Drawing Sheets

U.S. PATENT DOCUMENTS

| | | | |
|---|---|---|---|
| 2004/0088537 A1 | 5/2004 | Swander et al. | |
| 2004/0123141 A1* | 6/2004 | Yadav | 713/201 |
| 2004/0123157 A1 | 6/2004 | Alagna et al. | |
| 2004/0186850 A1 | 9/2004 | Chowdhury et al. | |
| 2004/0187034 A1* | 9/2004 | Tamura et al. | 713/201 |
| 2005/0047355 A1 | 3/2005 | Wood et al. | |
| 2005/0060412 A1 | 3/2005 | Chebolu et al. | |
| 2005/0172229 A1 | 8/2005 | Reno et al. | |
| 2005/0228899 A1 | 10/2005 | Wendkos et al. | |
| 2006/0021031 A1 | 1/2006 | Leahy et al. | |
| 2006/0031412 A1 | 2/2006 | Adams et al. | |
| 2006/0059238 A1 | 3/2006 | Slater et al. | |
| 2006/0059337 A1 | 3/2006 | Poyhonen et al. | |
| 2006/0123464 A1 | 6/2006 | Goodman et al. | |
| 2006/0123478 A1 | 6/2006 | Rehfuss et al. | |
| 2006/0168022 A1 | 7/2006 | Levin et al. | |
| 2006/0190993 A1* | 8/2006 | Noble | 726/3 |
| 2006/0230039 A1 | 10/2006 | Shull et al. | |
| 2007/0268837 A1 | 11/2007 | Melton et al. | |
| 2009/0043765 A1 | 2/2009 | Pugh | |
| 2009/0287844 A1 | 11/2009 | Bailey | |

OTHER PUBLICATIONS

"Netcraft Toolbar Tutorial," Netcraft Ltd, 4 pages, http://news.netcraft.com/archives/2004/12/29/netcrat_toolbar_tutorial.html (accessed Feb. 8, 2008).

Horowitz, Michael, "Examples of Links That Lie," Sep. 2004, 11 pages, http://www.michaelhorowitz.com/linksthatlie.html (accessed Feb. 8, 2008).

International Search Report and Written Opinion for International Patent Application No. PCT/US06/35159 mailed Oct. 12, 2007.

* cited by examiner

IDENTIFYING UNAUTHORIZED ACCESS TO A NETWORK RESOURCE

CROSS-REFERENCE TO RELATED APPLICATIONS

This application claims the benefit of U.S. Provisional Application, titled "Identifying Unauthorized Access To An Online Account," Ser. No. 60/782,601 filed on Mar. 15, 2006 and U.S. Provisional Application, titled "Identifying a Network Address Source For Authentication," Ser. No. 60/783,446 filed on Mar. 17, 2006, the benefit of the earlier filing dates of which are hereby claimed under 35 U.S.C. 119(e), and the entire contents of each are incorporated herein by reference.

FIELD OF ART

The invention disclosed herein is directed to computer security, and more specifically to enabling detection of unauthorized access to a computing resource such as an online email account, an online financial account, a general computer user account, and/or the like.

BACKGROUND

Most computer accounts, such as online email accounts, and/or other computer user accounts, are protected by a user identifier (ID) and a password. It can be difficult to determine whether the user ID and/or password have been compromised, and the account accessed by an unauthorized user. For example, a hacker may steal, guess, or use trial and error to obtain the valid ID and password. Some accounts may use a standard format for the user ID and/or password, which makes it easier for a hacker to determine the valid user ID and/or password. In other cases, a password may be viewed by a keylogger program, a network trace, or discovered by a co-worker, a family acquaintance, or another person associated with the account owner. This other person may then gain unauthorized access to the account. Because the unauthorized access occurs with the valid user ID and password, the unauthorized access may remain undetected by an online service and by the account owner. Authorization service providers generally do not provide account owners with data or services that may enable the account owners to detect an unauthorized access.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
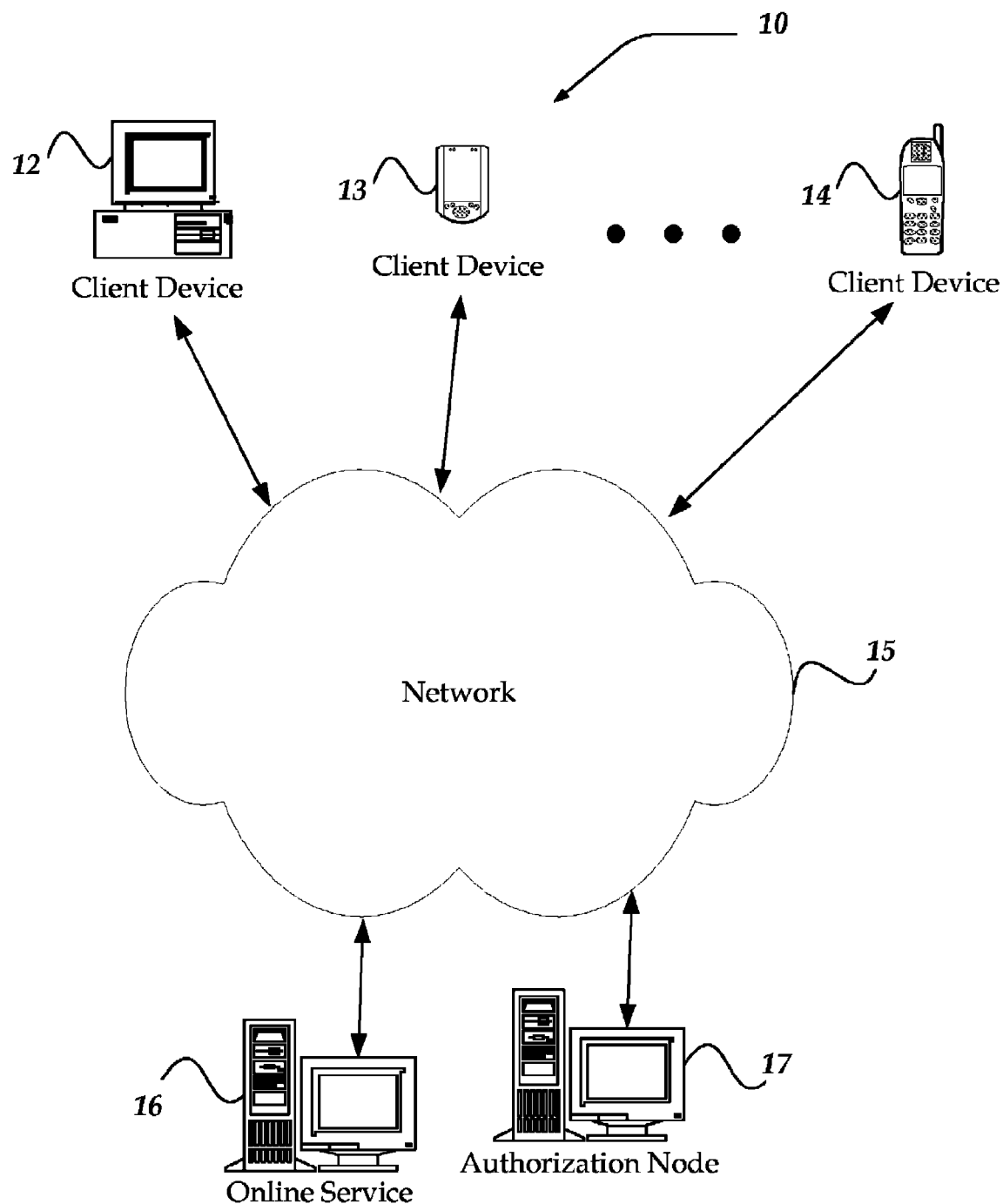
FIG. 1 shows a functional block diagram illustrating one embodiment of an environment for practicing the invention.

Embodiments of the present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" or "in an example embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In this specification, the term "client" refers to a computing module's general role as an end processor of data or services, and the term "server" refers to a computing module's role as a provider of data or services to one or more clients. In general, it is possible that a computing module can act as a client, requesting data or services in one transaction and act as a server, providing data or services in another transaction, thus changing its role from client to server or vice versa.

The term "web" generally refers to a collection of devices, data, and/or other resources that are accessible over a network according to one or more protocols, formats, syntax, and/or other conventions that are intended for use with computing devices, such as personal computers, laptop computers, workstations, servers, mini computers, mainframes, cellular phones, personal digital assistants (PDAs), and the like. Web protocols include, but are not limited to, the hypertext transfer protocol (HTTP). Such conventions include, but are not limited to, hypertext markup language (HTML) and extensible markup language (XML). The terms "web page" and "web data" generally refer to a document, file, application, service, and/or other data that conforms to web conventions and is generally accessible with a computing device running an application such as a general purpose browser. Example general purpose browsers include Internet Explorer™ from Microsoft Corporation, Netscape™ from Netscape Communications Corp., and Firefox™ from the Mozilla Foundation.

Web pages are generally indexed by search engines that are able to access web pages. An example search engine is Google™ by Google, Inc.

The term "URL" generally refers to a uniform resource locator, but may also include a uniform resource identifier and/or other address information. A URL generally identifies a protocol, such as hypertext transfer protocol (e.g., "http://"), a host name (e.g., "news.google.com") or a domain name (e.g., "google.com"), a path (e.g., "/intl/en/options"), and a specific file (e.g., "pack_installer.html") or a query string (e.g., "?hl=en").

Briefly, embodiments of the invention identifying unauthorized access to a network resource by comparing the log file on the Authentication service and the log file of a client. In certain embodiments, comparing timestamp, IP address, port number, and/or other data from both log files, a discrepancy can be determined and an unauthorized access can be found. From the timestamp, IP address, port number, and/or other data, an intruder, hacker, or other unauthorized user can be tracked down.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, a system 10 includes client devices 12-14, a network 15, an online service 16, and a network node 17 that may or may not be directly associated with the online service. Network 15 is in communication with and enables communication between each of client devices 12-14, online service 16, and network node 17. Online service 16 may comprise one or more servers for a legitimate website, an email service, a file storage service, a domain name assignment service, a network address identification service, and the like. Network node 17 may comprise a server, a domain control service, an authentication service that provides user authentication, and/or other network resource. Each network node has a network address, such as an IP address that is unique to each network node. The network address generally also includes a port number to identify a specific communication session, a particular resource within a network node, or other refinement to the network address to enable proper communication between nodes. The true network address is needed for communication to or from a network node. Address masking, domain name translation, and other schemes may disguise a network address at various points along a communication path. However, the true network address is derived at some point, or the communication will not occur between the intended nodes.

Client devices 12-14 may include virtually any computing device, including those generally capable of communicating over a network, such as network 15, to and from another computing device, such as online service 16, network node 17, each other, and the like. The set of such devices may include devices that are usually considered more general purpose devices and typically connect using a wired communications medium such as personal computers, multiprocessor systems, microprocessor-based or programmable consumer electronics, network PCs, and the like. The set of such devices may also include mobile terminals that are usually considered more specialized devices and typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. Similarly, client devices 12-14 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 12-14 includes a user interface that enables a user to control settings, and to instruct the client device to perform operations. Each client device may also include a browser application that is configured to receive and to send web pages, web-based messages, and the like. The browser application may be configured to receive and display graphics, text, multimedia, and the like, employing virtually any web based language, including, but not limited to Standard Generalized Markup Language (SGML), HyperText Markup Language (HTML), Extensible Markup Language (XML), a wireless application protocol (WAP), a Handheld Device Markup Language (HDML), such as Wireless Markup Language (WML), WMLScript, JavaScript, and the like. Client devices 12-14 may be further configured with a communication interface that enables the client device to send and receive messages from another computing device employing the same or a different communication mode, including, but not limited to email, instant messaging (IM), short message service (SMS) messaging, multi-media message service (MMS) messaging, internet relay chat (IRC), Mardam-Bey's internet relay chat (mIRC), Jabber, and the like.

Network 15 is configured to couple one computing device to another computing device to enable them to communicate. Network 15 is enabled to employ any form of medium for communicating information from one electronic device to another. Also, network 15 may include a wired interface, such as an Internet interface, and/or a wireless interface, such as a cellular network interface, in addition to an interface to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize cellular telephone signals over air, analog telephone lines, full or fractional dedicated digital lines including T1, T2, T3, and T4, Digital Signal level 3 (DS3), Optical Carrier 3 (OC3), OC12, OC48, Asynchronous Transfer Mode (ATM), Integrated Services Digital Networks (ISDNs), Digital Subscriber Lines (DSLs), wireless links including satellite links, or other communications links that are equivalent and/or known to those skilled in the art. Furthermore, remote computers and other related electronic devices could be remotely connected to either LANs or WANs via a modem and temporary telephone link. In essence, network 15 includes any communication method by which information may travel between client devices 12-14, online service 16, and/or network node 17. Network 15 is constructed for use with various communication protocols including transmission control protocol/internet protocol (TCP/IP), user datagram protocol (UDP), WAP, code division multiple access (CDMA), time division multiple access (TDMA), global system for mobile communications (GSM), and the like.

The media used to transmit information in communication links as described above generally includes any media that can be accessed by a computing device. Computer-readable media may include computer storage media, wired and wireless communication media, or any combination thereof. Additionally, computer-readable media typically stores and/or carries computer-readable instructions, data structures, program modules, or other data that can be provided to a processor. Computer-readable media may include transmission media for transmitting a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wireless media such as acoustic, RF, infrared, and other wireless media, and wired media such as twisted pair, coaxial cable, fiber optics, wave guides, and other wired media.

One embodiment of an electronic device is described in more detail below in conjunction with FIG. 2. For discussion purposes, a general purpose client computing device is described as an example. However, a server device, a special purpose device (e.g., cell phone), and/or other electronic device may be used in embodiments of the invention. In this example, a client device 20 may include any computing device capable of connecting to network 15 to enable a user to communicate with other network resources, such as client devices, online service 16, and/or questionable network node 17. Client device 20 may include many more components than those shown. The components shown, however, are sufficient to disclose an illustrative embodiment for practicing the invention. Many of the components of client device 20 may also be duplicated in a server of online service 16, a server of questionable network node 17, and/or other electronic devices.

As shown in the figure, client device 20 includes a processing unit 22 in communication with a mass memory 24 via a bus 23. Mass memory 24 generally includes a RAM 26, a ROM 28, and other storage means. Mass memory 24 illustrates a type of computer-readable media, namely computer storage media. Computer storage media may include volatile and nonvolatile, removable and non-removable media implemented in any method or technology for storage of information such as computer readable instructions, data structures, program modules or other data. Other examples of computer storage media include EEPROM, flash memory or other semiconductor memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

Mass memory 24 stores a basic input/output system ("BIOS") 30 for controlling low-level operation of client device 20. The mass memory also stores an operating system 31 for controlling the operation of client device 20. It will be appreciated that this component may include a general purpose operating system such as a version of Windows™, UNIX, LINUX™, or the like. The operating system may also include, or interface with a virtual machine module that enables control of hardware components and/or operating system operations via application programs.

Mass memory 24 further includes one or more data storage units 32, which can be utilized by client device 20 to store, among other things, programs 34 and/or other data. Programs 34 may include computer executable instructions which can be executed by client device 20 to implement an HTTP handler application for transmitting, receiving and otherwise processing HTTP communications. Similarly, programs 34 can include an HTTPS handler application for handling secure connections, such as initiating communication with an external application in a secure fashion. Other examples of application programs include schedulers, calendars, web services, transcoders, database programs, word processing programs, spreadsheet programs, and so forth. Accordingly, programs 34 can process web pages, audio, video, and enable telecommunication with another user of another electronic device.

In addition, mass memory 24 stores one or more programs for messaging and/or other applications. A messaging client module 36 may include computer executable instructions, which may be run under control of operating system 31 to enable email, instant messaging, SMS, and/or other messaging services. Similarly, a server device configured much like client device 20 (and/or client device 20 itself) may include a messaging server module 37, which provides routing, access control, and/or other server-side messaging services. Client device 20 may further include a detection module 38, which generally detects unauthorized access to a computing resource and/or evaluates communications for valid senders, requests, and/or other data. In one embodiment, detection module 38 may comprise an authorization module, which may check email messages, file downloads, redirections, and/or other communications. Another example embodiment comprises an anti-phishing modile, which interacts with a phishing website to enable client device 20 to identify the phishing website's network address and may determine whether the network address is associated with an illegitimate website. Detection module 38 may be implemented separate from other applications, may be implemented as a plug-in to another application (such as a browser), may be implemented directly within another applications (such as an email application), may be implemented as a server application, and/or other forms.

Figure 2:
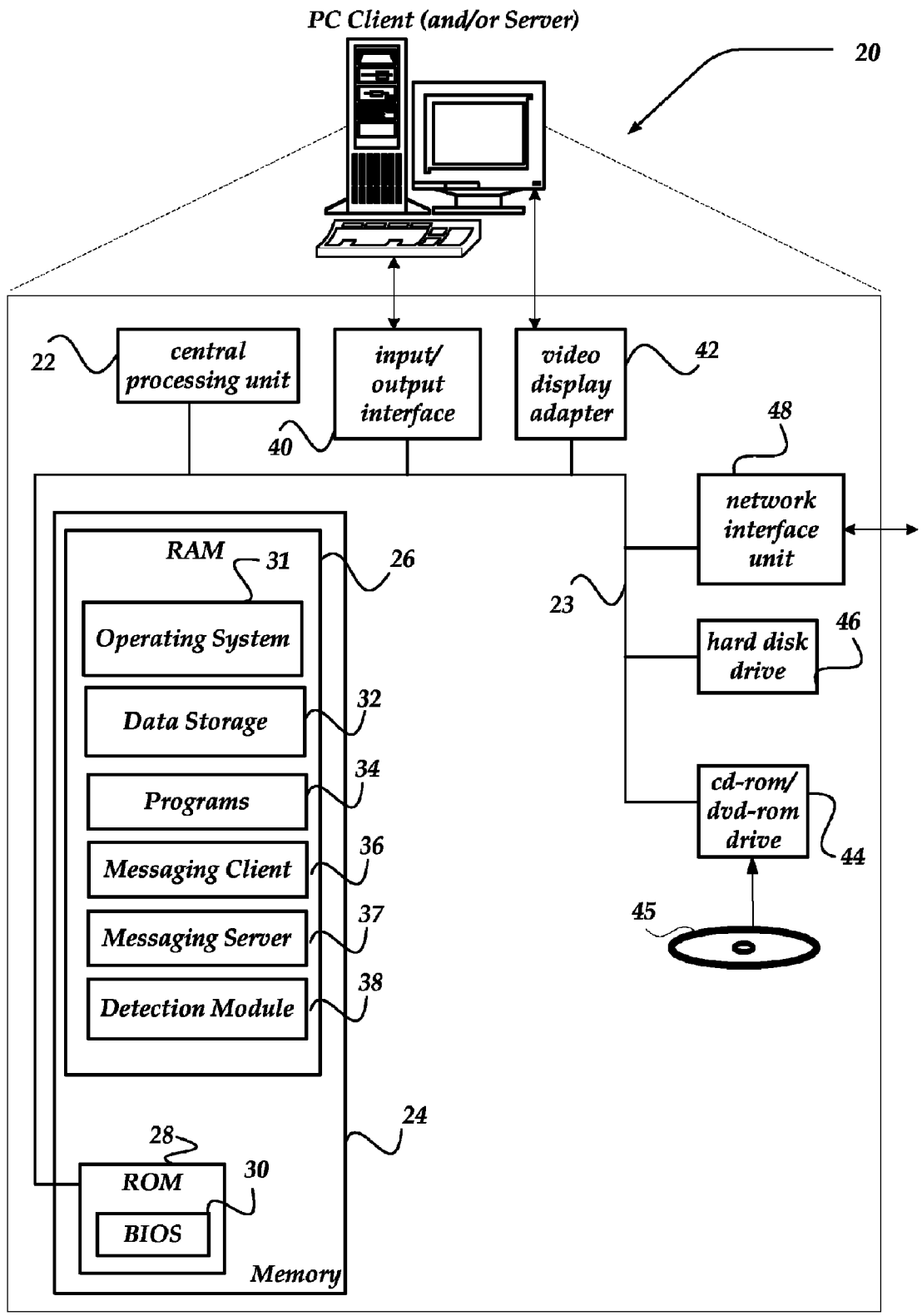
FIG. 2 shows one embodiment of a client and/or server device that may be included in a system implementing the invention.

Client device 20 also includes an input/output interface 40 for communicating with input/output devices such as a keyboard, mouse, wheel, joy stick, rocker switches, keypad, printer, scanner, and/or other input devices not specifically shown in FIG. 2. A user of client device 20 can use input/output devices to interact with a user interface that may be separate or integrated with operating system 31 and/or programs 34-38. Interaction with the user interface includes visual interaction via a display, and a video display adapter 42.

For some client devices such as a personal computer, client device 20 may include a removable media drive 44 and/or a permanent media drive 46 for computer-readable storage media. Removable media drive 44 can comprise one or more of an optical disc drive, a floppy disk drive, and/or a tape drive. Permanent or removable storage media may include volatile, nonvolatile, removable, and non-removable media implemented in any method or technology for storage of information, such as computer readable instructions, data structures, program modules, or other data. Examples of computer storage media include a CD-ROM 45, digital versatile disks (DVD) or other optical storage, magnetic cassettes, magnetic tape, magnetic disk storage or other magnetic storage devices, RAM, ROM, EEPROM, flash memory or other memory technology, or any other medium which can be used to store the desired information and which can be accessed by a computing device.

Via a network communication interface unit 48, client device 20 can communicate with a wide area network such as the Internet, a local area network, a wired telephone network, a cellular telephone network, or some other communications network, such as network 15 in FIG. 1. Network communication interface unit 48 is sometimes known as a transceiver, transceiving device, network interface card (NIC), and the like.

Exemplary Implementation

In an exemplary embodiment of the present invention, an online service or network node gathers information about accesses to an account and makes that information available to the account owner and/or other authorized user. When an account is accessed, the authentication service on the network node logs a timestamp, the client internet protocol (IP) network address from which the account was accessed, the client TCP/UDP port number, and the user ID. This access information is generally stored in a server log file or a database in chorological order. A copy of this information will also be returned to the client and stored on a trusted log file. In general, these two log files will be the same and synchronized. Any accesses by an unauthorized client will be recorded in the server log of the authentication service, but will not be collected by the account owner or other authorized user of the account. A comparison will then reveal the unauthorized accesses and/or unauthorized client(s). The comparison may be performed manually or automatically every time the account has been accessed.

An authentication service may also obtain a client identifier, routing data, and/or other access information. The authentication service or the client may use the IP address or other access information to obtain ownership name, geographic location, and/or other information associated with the account access. For example, the authentication service may submit an IP address to an assigned numbers authority or local database to determine the owner, country code, and/or other ownership information. The account owner and/or a corresponding client can use all, or portions of received information that are stored on the server and on the client to detect unauthorized access to the account.

In one embodiment, the authentication service returns information at each login. For example, when a user accesses an online email account, the online service logs the access, time, ownership, and/or other information in a server log file. The authentication service returns a copy of the logged information in a message to the accessing client, and generally stored in a local log file. The user may be required to open the message or the returned information may be automatically displayed in a portion of a display window. The accessing user can review the returned information for accuracy and/or future reference. For example, the accessing user may review the returned timestamp, IP address, and TCP/UDP port number for the current session. The user may also record the returned information upon each access. In addition, or alternatively, the returned information will be added to a client trusted log file, a client database, a removable storage device such as USB storage, and/or other client data store on the accessing client or at a predefined client or server that is trusted by the account owner. To protect the returned information, a different password and/or other protection may be applied to the returned message, the data within the message, and/or the client data store.

Alternatively, or in addition, if the account owner uses multiple clients, or the client device is not secure and can be access by someone else, or it is shared by other people, the local trusted log file may need to be protected from other users. Alternatively, the account owner may store the returned information in a trusted central location that only the account owner or other authorized user can access, or on a trusted removable storage device such as USB storage. With a removable device for the trusted log file, the account owner may use any client device in any location. If none of the above storages are available, the account owner may write down this information for future reference.

To check for possible unauthorized access, the account owner and/or a detection module may compare the log file on the server against the trusted log file. If there is discrepancy, there has likely been an unauthorized accessed to the account. This comparison can be done automatically every time the account has been accessed or requested by the account owner, or by predefine criteria. The client may review the returned information stored at a certain trusted storage location, such as removable USB storage, to detect any unusual data. For example, the account owner may recognize that the account was accessed on a date that the account owner did not access the account. This may indicate that the account owner's client device was used by a co-worker or other unauthorized user to access the account. Similarly, the account owner may detect that the account was accessed from an IP address that is not used by the account owner or that is associated with a country code from which the account owner has never accessed the account.

In another embodiment, the account owner may access and review the received information logged by the authentication service to recognize an unauthorized access. Another password or other protection method may be used, so that only the account owner can access the corresponding server log. The authentication service may keep logged information based on a predefined period, a predefined storage size, a service level, and/or other criteria. The account owner may access the server log via a browser, a file transfer, and/or other method. The authentication service may also send an email message or other message with the logged information at predefined periods and/or upon request from the account owner. As above, another password or other protection may be used to access the server log or logged information sent to the account owner.

In a particular embodiment, an IP address and a transmission control protocol (TCP)/user datagram protocol (UDP) port number of an accessing client are logged. This information is checked via an assigned numbers authority, such as the Internet Corporation for Assigned Names and Numbers (ICANN) or a local database. The authentication service, or the account owner, can use the assigned number authority to determine the address owner's name, country code, and/or other information. This can also be done for addresses assigned to a proxy server, a network address translation (NAT) server, a firewall, and/or other network intermediaries. Sometimes, the accessing user may be behind a proxy server, a network address translation (NAT) server, a firewall, and/or other network intermediaries. The server log of the online service may show the IP address of the proxy server, the NAT server, the firewall or the other network intermediaries instead of the accessing user's IP address. To find out the true access user's IP address, the online service, the account owner, or other authorized entity may need to check one or more intermediary log files. From the intermediary log file(s), the authorized entity may map a timestamp and/or TCP port number to internal IP address information. The account owner or other authorized entity may compare the timestamp and port number from a network intermediary to the information recorded at the client. An additional, or non-matching entry in the intermediary log file, can indicate an unauthorized access to the account. In addition, the intermediary log file can store an internal IP address from within the local network served by the intermediary network device. The internal IP address can be checked against internally assigned names to determine a name, a location, and/or other information. Obtaining such internal information may involve cooperation from an internet service provider, from an owner of the network intermediary, and/or from other sources. With the IP address information, one may be able to track down the unauthorized user.

Figure 3:
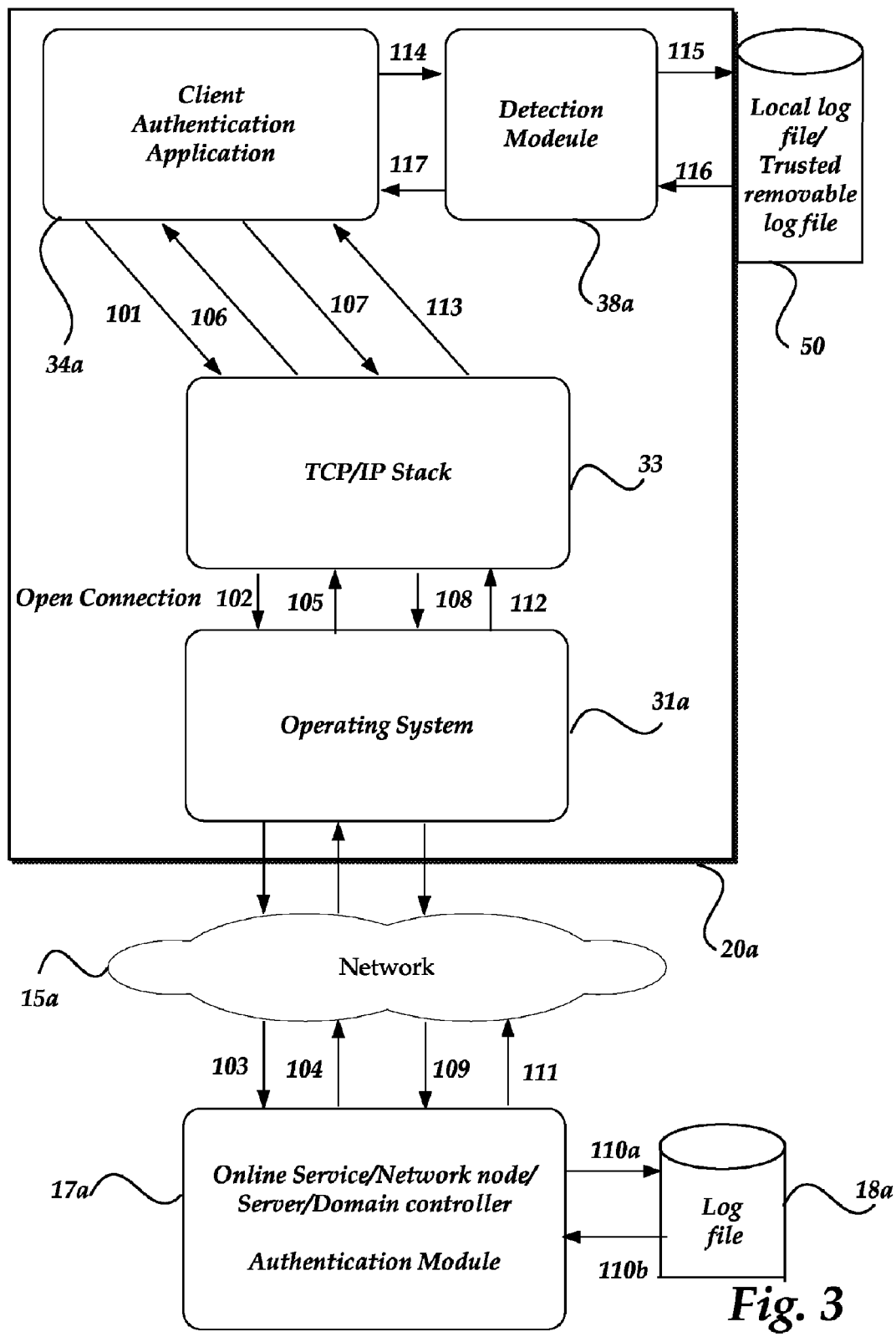
FIG. 3 illustrates an architecture and communication sequence for one embodiment of the present invention.

FIG. 3 illustrates an architecture, communication sequence, and method for a further embodiment of the present invention. Not all of the illustrated modules may be required to practice the invention, or additional modules may be included for other embodiments. In various embodiments, some modules may be combined, while other modules may be divided into multiple modules. Example scenarios are discussed relative to the following architecture.

In this example embodiment, the architecture includes a client 20a that communicates through a network 15a to an IP address of a Network Node 17a that corresponds to a website, a server, a domain controller, an FTP site, an Email server, or other network resources. Network node 17a also generally provides an authentication function to check online user identifiers and passwords of clients that access the network node. In addition, or alternatively, network node 17a may communicate with a remote authentication node to check clients that attempt to access the network node. Client 20a includes an operating system 31a in communication with network 15a and in communication with a TCP/IP stack 33. TCP/IP stack 33 is in communication with a Client Authentication Application 34a, which is in communication with a Detection module 38a. The Client Authentication Application 34a may be an email application, a browser, or other application. Client Authentication Application 34a generally communicates with network node 17a to enable a user to access one or more network resources of network node 17a and/or other network nodes. The Client Authentication Application also generally communicates with network node 17a to authenticate a user with an account ID and password, a digital signature, and/or other authentication method. The detection module 38a is in communication with a local database and/or log file 50, which may be included in client 20a, may be in communication with client 20a, may be a removable device, or the like. Local log file 50 generally includes timestamps, IP addresses, TCP/UDP port numbers, or other data associated with accesses to an account that corresponds to a network resource of network node 17a.

A user of client 20a may initiate a network connection, such as to an email server. Client Authentication Application 34a detects a user requests for connection to the email server, at a communication step 101. The request is first sent to TCP/IP stack 33 to resolve a domain name or URL into an IP address. Resolving a domain name may require accessing a DNS. However, the IP address from a DNS may be masked or otherwise misleading. Further tracing may be performed to obtain a correct IP address. TCP/IP stack 33 sends the request through to operating system 31a at a communication step 102, and the operating system makes a TCP connection through network 15a to Network Node 17a, at a communication step 103.

Network Node 17a (e.g., an email server) receives the request, which generally includes a received IP address and received port number of client 20a. The network server responds to the request and asks for account ID and password at a communication step 104. The message from the network node also generally includes the IP address and port number of the network node to maintain the communication session between the network node and the client. Client operating system 31a passes this information to TCP/IP stack 33 at a communication step 105. The TCP/IP stack passes control to the client authentication application 34a at a communication step 106. The application may request the account ID and password from the user and pass them to the TCP/IP stack, at a communication step 107, then to operating system 31a at a communication step 108. The operating system passes the account ID and password to the network node's authentication module, along with the client's IP address and port number, at a communication step 109.

The network node authentication module verifies the user credentials and writes a timestamp, the client IP address, the client port number and/or other access information to a network node log file 18a at a communication step 110a. This access information may be referred to as received access information. The network node log file stores the received access information. The network node authentication module sends a copy of this received access information to client 20a at a communication step 111, and through to the TCP/IP stack at a communication step 112. This copy of the received access information may indicate a successful authentication with network node 17a for access to the email account or other account. Conversely the copy of the received information may indicate a failure to authenticate. In addition, or alternatively, the network node may communicate the received access information to an authorized node, which an authorized user can access for future evaluation. In the present embodiment, the copy of the received access information is returned to Client Authentication Application 34a at a communication step 113.

Client Authentication Application 34a then passes the copy of the received access information to Detection module 38a, at a communication step 114. The Detection module or the Client Authentication Module may display the copy of the received access information, and/or owner information associated with the received access information. Generally, the Detection module appends the copy of the received access information to a local log file of database 50, at a step 115. If the authentication failed, detection module 38a, may log the attempted accesses in the local log file of database 50, and may display an error message. If client 20a is secured by the authorized user, the copy of the received access information stored in the local log file on client 20a would be trusted by the authorized user. For example, if client 20a is in a locked location, an authorized user may trust storing the copy of the received access information in the local log file of client 20a.

In less secure circumstances, the authorized user may record the copy of the received timestamp, received IP address, received port number, and/or other received access information on a separate controlled storage, for future reference. For example, the authorized user may record the copy of the received access information onto a removable storage device, such as a USB storage device. If the authorized user uses a different client, such as a public computer, the authorized user should store the received access information on a trusted removable storage device or on a trusted remote network node. In addition, or alternatively, the authorized user may cause received access information to be stored at a different remote network node that is accessible by the authorized user or other authorized users. An additional user ID and password may be needed to access the different remote network node.

Conversely, the access may have been made by an unauthorized user of client 20a, or by an unauthorized user from a different client. If client 20a was used by an unauthorized user, the corresponding entry in the local log file, would not be known to, or trusted by an authorized user. For example, client 20a may be used by an unauthorized user to access an authorized user's email account, a bank account, an investment account, company user account, or other account on network node 17a. This unauthorized access may be recorded on client 20a. More specifically, the corresponding copy of the received access information may be stored in the local log file of client 20a. However, this local log file could not be trusted, and the copy of the received access information would not be stored on the authorized user's removable storage. In addition, or alternatively, the copy of the received access information would not be stored on the different remote network node that is separately accessible by the authorized user. Thus, the copy of the received access information, for the unauthorized access, would not be included in a trusted log file of trusted access information.

Immediately upon getting the copy of the received access information, or at a later time selected by an authorized user, the Detection module accesses the trusted access information. This may mean accessing the trusted access information from the local log file of database 50, at a step 116, if database 50 is secured, or from a trusted log file of removable or remote storage device if it holds a trusted database 50. At a step 110b, the Detection module also accesses the original received access information that was stored in the network node received log file 18a. The Detection module compares the network node received log file 18a from network service 17a against the trusted log file. The Detection module may send the result of the comparison to the Client Authentication Application at a communication step 117. If there is discrepancy, the Client Authentication Application may issue a warning and may report this to the account owner with the timestamp, IP address, TCP/UDP port number, and/or other information about the suspected unauthorized access. The account owner may use this information to find an intruder, hacker, or other unauthorized user. This information can also be returned to the network server authentication module for further investigation.

Figure 4:
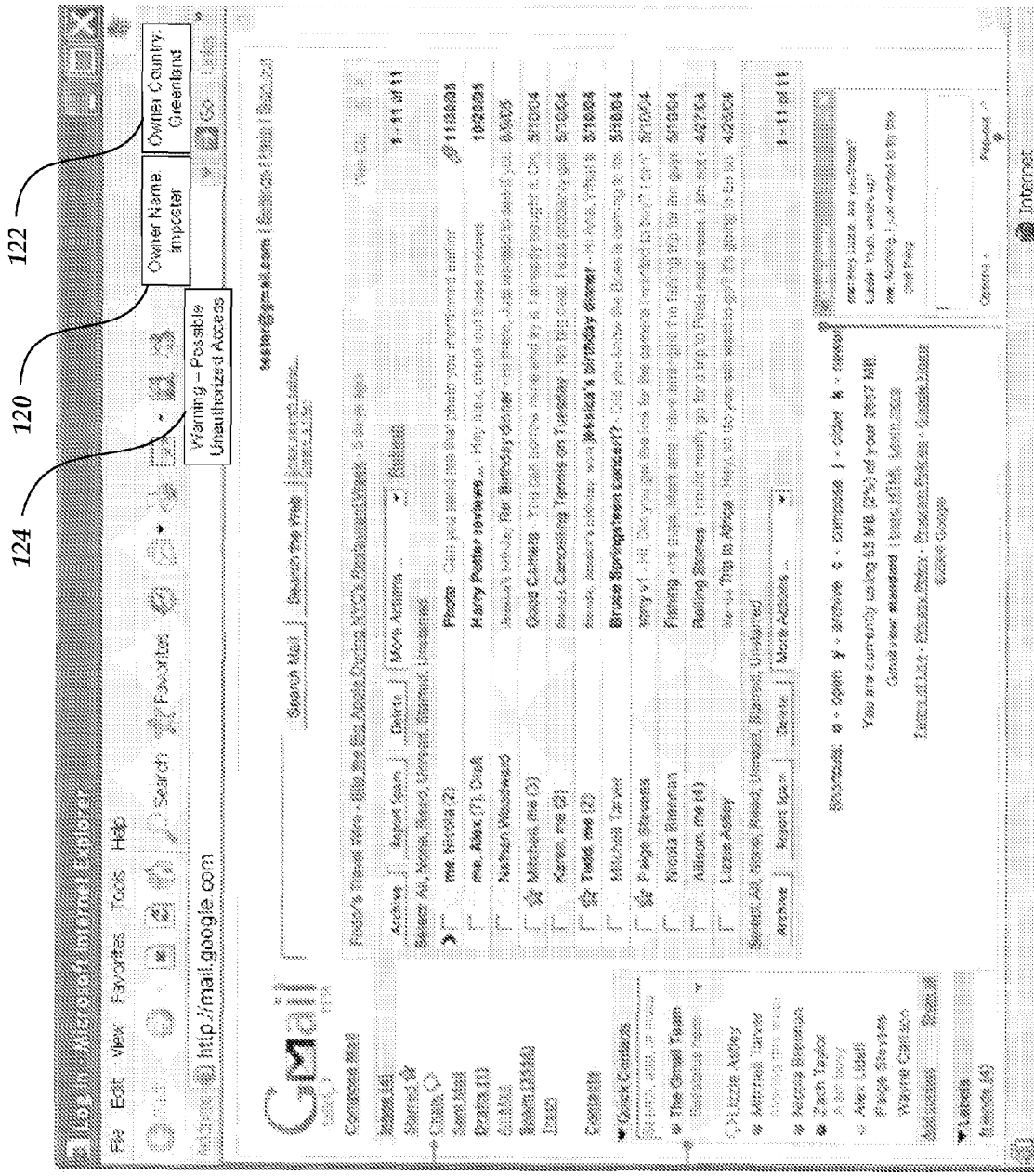
FIG. 4 illustrates a screen shot for one embodiment of the present invention.

FIG. 4 illustrates a screen shot of an example online email account being accessed with a client. Based on the client's IP address, port number, and/or other access data, the IP owner name, country code, and/or other ownership data may be returned to the client. The IP address owner is displayed in a browser field 120 as "Imposter." This IP address owner may be associated with an authorized client. For example, this IP address owner may be a company at which the account owner works. A corresponding country associated with the IP address is shown as Greenland in a country field 122. This may be a country in which the company has an office. However, if the account owner has never been to Greenland, or never accessed the account from Greenland, the current access may be unauthorized. The account owner, the server, and/or other decision maker uses the displayed data to compare with a server log and determine whether the current access matches the records of authorized accesses to the account. The comparison may be done at a later time, or done in real time. For real time comparisons, the decision maker may use predefined information about authorized clients and/or may determine patterns of use that enable the decision maker to infer possible unauthorized access.

If the access is not authorized, an optional warning may be displayed in another browser field 124, in a pop-up window, and/or in another way. The optional warning may scare the current user enough to cause the current user to cease use of the account. In addition, or alternatively, additional validation information may be requested, or the account access can be denied or terminated. The optional warning may be ignored if the current user is authorized. In another embodiment, no warning is provided, but a report may be made to a file, sent as an instant message, sent as an email, or otherwise provided to the account owner, administrator, security personnel, or the like. As discussed above, discovery of an unauthorized access may not occur until the account owner accesses the log data and compares the log data with records kept by the account owner.

Figure 5:
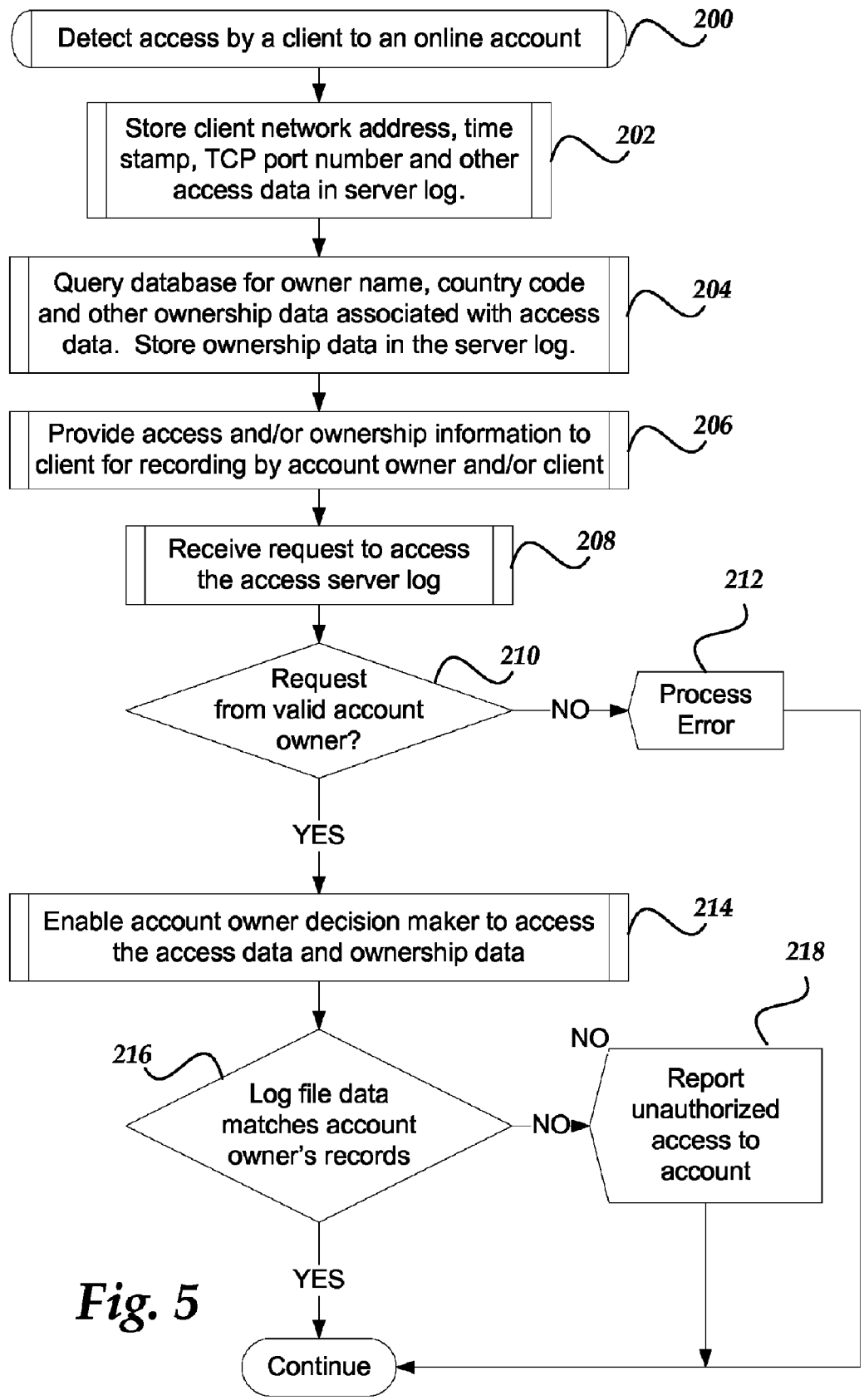
FIG. 5 is a flow diagram illustrating example logic according to another embodiment of the present invention.

FIG. 5 is a flow diagram illustrating example logic of another embodiment for identifying an unauthorized access to an account. At an operation 200, an online service, such as an online email service, an online storage service, a company virtual private network service, or the like, detects access by a client to an online account. A corresponding server, such as a general purpose computing device, stores an entry of a timestamp, a received IP address, a received port number, and/or other received access information from a client. The received access information is stored in a server log file at an operation 202. The entry generally includes a timestamp, IP address(es), port number(s), and/or other access data associated with the detected access by the client device. The server accesses a database of an assigned numbers authority to obtain ownership data associated with the access data, at an operation 204. The ownership data can be appended to the server log file. The access data and the ownership data are made available to the account owner, at an operation 206, via access to the server log file, via a message, and/or the like. The access data and ownership data can also be sent to a client, such as the accessing client and/or a predefined authorized client at a predefined network address. The client can display the data and/or store the data in a client trusted log file. The account owner may record data manually, or pre-authorized clients can automatically store access data and/or ownership data.

The account owner, a software decision module, or other decision maker requests access to the server log, at an operation 208. At a decision operation 210, the server may require an additional password, and/or other information to authenticate the requester. If the server determines that the request is not from the valid account holder, the server processes an error at operation 212, and/or otherwise denies access to the server log. Conversely, if the server determines that the request is from the valid account holder, the server enables access to the server log file, at an operation 214. At a decision operation 216, decision maker compares the server log data with the trusted access data gathered by the account owner or by the client device. The decision maker can be a human account owner, a pre-authorized client, the server, and/or a remote decision maker. If all data matches, normal processing continues. However, if an unacceptable difference exits between the server log file and client-side trusted data, the difference is reported to the account owner, at an operation 218.

Figure 6:
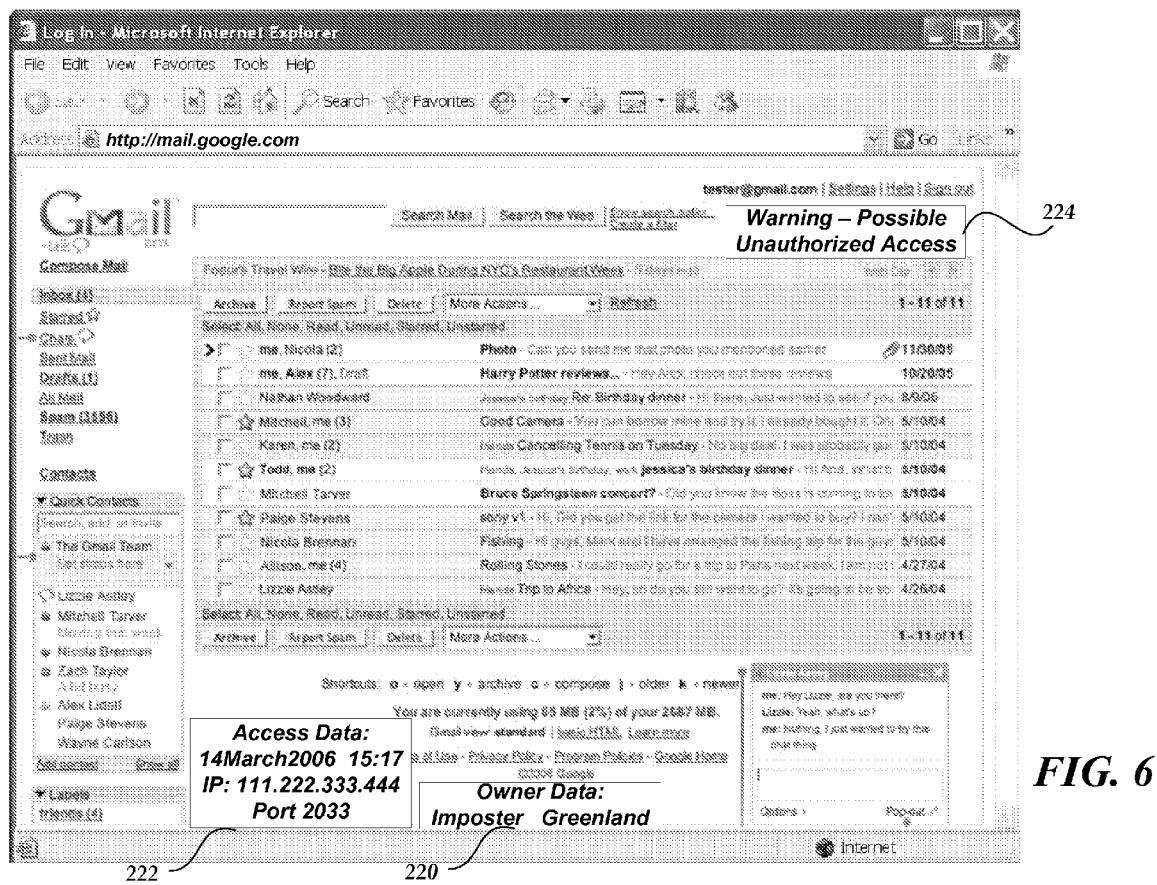
FIG. 6 illustrates a screen shot for another embodiment of the present invention.

FIG. 6 illustrates a screen shot for another embodiment of the present invention. In this example, client IP address owner and location data is displayed in an owner field 220 that is part of the web page document that comprises an online email account interface. Similarly, detailed access data for the current email account session is displayed in an access data field 222, that is also part of the web page. A warning field 224 may also be part of the web page. Any, or all of the fields may be implemented with pop-up windows, script modules, and/or other interfaces.

The above specification, examples, and data provide a complete description of the manufacture and use of the composition of the invention. For example, digital certificates may also be used for authentication, encryption may be used for communications, and other features may be included. However other embodiments will be clear to one skilled in the art. Since many embodiments of the invention can be made

What is claimed as new and desired to be protected by Letters Patent is:

1. A method for alerting an authorized user of an access to an online account, comprising:
   storing an access entry within an access log as a result of the online account being accessed using correct authentication information, the access entry comprising: a timestamp denoting the time of said access, a network internet protocol (IP) address, a computed location and a TCP/UDP port identifier;
   comparing the stored access entry within the access log with one or more trusted entries, at least one trusted entry comprising a trusted network IP address and a trusted TCP/UDP port identifier established by the authorized user, the comparison further comprising:
      when the stored access entry matches at least one trusted entry then determining the online account was accessed by the authorized user from a trusted location; and
      when the stored access entry does not match a trusted entry, then storing the timestamp, IP address, computed location and TCP/UDP port identifier as a potentially unauthorized access to the online account within the access log;
   displaying the potentially unauthorized access stored in the access log to the online account within a display field of the online account when the authorized user accesses the online account from a trusted location;
   displaying the timestamp, IP address, computed location and TCP/UDP port identifier within the display field of the online account; and
   receiving an indication from the authorized user if there had been an unauthorized access to the online account.

2. The method of claim 1, wherein the trusted entry is stored in a trusted storage that stores a copy of the received access information, wherein the copy is provided by the online account to the trusted storage prior to comparing.

3. The method of claim 2, wherein the trusted storage comprises one of the following:
   a removable storage controlled by an authorized user and removably coupled to a trusted client in communication with the online account to receive the copy of the received access information; and
   a trusted network node in communication with the online account, wherein the trusted network node is accessible by an authorized user with additional authorization information.

4. The method of claim 3, further comprising:
   determining ownership information based on the received network IP address and on the received TCP/UDP port identifier, wherein the ownership information identifies an owner of the received network IP address; and
   providing the ownership information to the accessing client for at least one of the following; displaying to a user of the accessing client and storing in a local storage coupled to the unverified accessing client.

5. The method of claim 4, wherein the ownership information comprises at least one of the following; an owner name and an owner location.

6. The method of claim 5, wherein displaying further comprises providing an internet browser with a pop up window displaying the potentially unauthorized access to the online account.

7. The method of claim 6, wherein the removable storage is configured to provide trusted access information to the online account.

8. The method of claim 7, wherein the online account comprises one of the following; an online email account, an online financial account; a website, and a general computer user account.

9. The method of claim 8, wherein the received access information is detected based at least in part on intermediary access information of an intermediary network node coupled between the unverified accessing client and the online account.

10. The method of claim 9, wherein the unverified accessing client is the trusted accessing client.

11. A system for alerting an authorized us of an access, comprising:
   a communication interface in communication with a network; a memory for storing instructions; and
   a processor in communication with the communication interface and with the memory, wherein the processor performs actions based at least in part on the stored instructions, including:
      storing an access entry within an access log as a result of the online account being accessed using correct user name and password information, the access entry comprising: a timestamp denoting the time of said access, a network internet protocol (IP) address, a computed location and a TCP/UDP port identifier;
      comparing the stored access entry within the access log with one or more trusted entries, each trusted entry comprising a trusted network IP address and a trusted TCP/UDP port identifier established by the authorized user, the comparison further comprising:
         when the stored access entry matches a trusted entry then determining the online account was accessed by the authorized user from a trusted location; and
         when the stored access entry does not match a trusted entry, then storing the timestamp, IP address, computed location and TCP/UDP port identifier is stored as a potentially unauthorized access to the online account within the access log;
      providing to a display, the potentially unauthorized access stored in the access log to the online account within a display field of the online account when the authorized user accesses the online account from a trusted location, the display enabling the authorized user to determine within the display of the online account if there was an unauthorized access to the account; and
      receiving an indication from the authorized user if there has been an unauthorized access to the online account.

12. The system of claim 11, wherein the trusted access information is a stored in a trusted storage that stores a copy of the received access information, wherein the copy is provided by the online account to the trusted storage prior to comparing.

13. The system of claim 12, wherein the trusted storage comprises one of the following:
   a removable storage controlled by an authorized user and removably coupled to a trusted client in communication with the online account to receive the copy of the received access information; and
   a trusted network node in communication with the online account, wherein the trusted network node is accessible by an authorized user with additional authorization information.

14. The system of claim 13, wherein the instructions further cause the processor to perform the operations of:
- determining ownership information based on the received network IP address and on the received TCP/UDP port identifier, wherein the ownership information identifies an owner of the received network IP address; and
- providing the ownership information to the unverified accessing client for at least one of the following; displaying to a user of the accessing client and storing in a local storage coupled to the accessing client.

15. The system of claim 14, wherein the ownership information comprises at least one of the following; an owner name and an owner location.

16. The system of claim 15, wherein the instructions further cause the processor to perform the action of providing a warning that the a previous potential unauthorized access was identified.

17. The system of claim 16, wherein the removable storage is configured to provide trusted access information to the online account. the authorization information comprises at least one of the following; a password, a digital signature, and encrypted data.

18. The system of claim 17, wherein the online account comprises one of the following; an online email account, an online financial account; a website, and a general computer user account.

19. The system of claim 18, wherein the received access information is detected based at least in part on intermediary access information of an intermediary network node coupled between the unverified accessing client and the online account.

20. A non-transitory computer-readable memory medium having computer-executable instructions that, when executed in a computing system, perform a method comprising:
- receiving an indication that a user having an authenticated user name and password has been provided access to a secure website;
- receiving a timestamp, a network internet protocol (IP) address, a computed location and a TCP/UDP port identifier for the user that accessed the secured website;
- comparing the received timestamp, IP address, computed location and TCP/UDP port identifier to one or more trusted IP addresses and TCP/UDP port identifiers, when there is a match then the user is a verified user, and when there is not a match the timestamp, IP address, computed location and TCP/UDP port identifier is stored in an access log;
- providing to the verified user, within the secure website, a representation of the access log listing the timestamp, IP address, computed location and TCP/UDP port identifier of any unauthorized access in the access log; and
- receiving an indication from the verified user if there was an unauthorized access of the secure website.

* * * * *